US006952464B2

(12) United States Patent
Endo

(10) Patent No.: US 6,952,464 B2
(45) Date of Patent: Oct. 4, 2005

(54) RADIATION IMAGING APPARATUS, RADIATION IMAGING SYSTEM, AND RADIATION IMAGING METHOD

(75) Inventor: Tadao Endo, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/829,257

(22) Filed: Apr. 22, 2004

(65) Prior Publication Data

US 2004/0247079 A1 Dec. 9, 2004

(30) Foreign Application Priority Data

Apr. 22, 2003 (JP) ........................................ 2003/117237

(51) Int. Cl.[7] .................................................. H05G 1/64

(52) U.S. Cl. ................................ 378/98.11; 250/370.09

(58) Field of Search ........................... 378/62, 98, 98.2, 378/98.9, 98.11, 98.12; 250/370.08, 370.09, 370.11

(56) References Cited

U.S. PATENT DOCUMENTS

2004/0213377 A1 * 10/2004 Endo ....................... 378/98.11

FOREIGN PATENT DOCUMENTS

| | | | |
|---|---|---|---|
| JP | 2-273873 | 11/1990 | ........... G06F/15/62 |
| JP | 3-106343 | 5/1991 | ............ A61B/6/00 |
| JP | 3-133276 | 6/1991 | .......... H04N/5/325 |
| JP | 5-260382 | 10/1993 | .......... H04N/5/325 |
| JP | 2000-116637 | 4/2000 | ............ A61B/6/00 |

* cited by examiner

*Primary Examiner*—Edward J. Glick
*Assistant Examiner*—Courtney Thomas
(74) *Attorney, Agent, or Firm*—Fitzpatrick, Cella, Harper & Scinto

(57) ABSTRACT

A radiation imaging apparatus includes a radiation detecting unit and an image-display controlling unit. The radiation detecting unit has radiation detectors, arranged in a two-dimensional array, for detecting radiation transmitted through an object as electrical signals. The image-display controlling unit radiographs radiation images of the object, detected as the electrical signals by the radiation detecting unit, at a predetermined frame rate as continuous images in a plurality of frames and displays a processed image given by subtracting an m-th image from an (m+1)-th image in synchronous with either the m-th image or the (m+1)-th image that does not undergo the subtraction in a display, where m is a natural number.

11 Claims, 6 Drawing Sheets

LEGEND

101 PHOTOELECTRIC TRANSDUCER
102 SWITCHING ELEMENT (TFT)
103 INSULATING SUBSTRATE
104 FIRST THIN METAL FILM
105 SECOND THIN METAL FILM
111 THIN INSULATING FILM
112 PHOTO-ELECTRIC CONVERSION SEMICONDUCTOR LAYER
113 $N^+$ LAYER

LEGEND

104 FIRST THIN METAL FILM
105 SECOND THIN METAL FILM
111 THIN INSULATING FILM
112 PHOTO-ELECTRIC CONVERSION SEMICONDUCTOR LAYER
113 $N^+$ LAYER

RADIATION IMAGING APPARATUS, RADIATION IMAGING SYSTEM, AND RADIATION IMAGING METHOD

BACKGROUND OF THE INVENTION

1. Field of the Invention

The present invention relates to radiation imaging apparatuses for medical diagnoses or industrial nondestructive inspections and, more particularly, to a radiation imaging apparatus and a radiation imaging system suitable for taking moving pictures, where the radiation includes not only X-rays but also alpha-rays, beta-rays, and gamma-rays.

2. Description of the Related Art

Hitherto, X-ray imaging systems installed in hospitals or the like adopt two imaging technologies. A film imaging technology in which a patient is irradiated with X-rays and a film is exposed to the X-rays transmitted through the patient, and a digital imaging technology in which X-rays transmitted through a patient are converted into electrical signals, which are detected as digital values by an analog-to-digital converter to store the detected digital values in a memory. In the latter technology, a visible light emitted from a photostimulable phosphor, that is called an imaging plate (IP) mainly made of BaFBr:Eu, is converted into electrical signals by a photomultiplier for digitization by temporarily storing X-ray images in the IP and, then scanning the IP with laser beams.

Recently, a technology has been put into practical use in which an X-ray to visible-light converting phosphor mainly made of $Gd_2O_2S$:Tb or CsI:TI, is irradiated with X-rays and visible light emitted in proportion to the amount of the X-rays is converted into electrical signals by an amorphous silicon light sensor for digitization. Apparatuses adopting this technology are called flat panel detectors (FPDs). One type of the FPDs, which is made of Se or $PbI_2$, directly absorbs X-rays and converts the absorbed X-rays into electrical signals, without using the X-ray to visible-light converting phosphor.

In another apparatus, a primary phosphor is irradiated with X-rays, photoelectrons emitted from the screen of the primary phosphor are accelerated and converged by using an electron lens, and the X-ray images on a secondary phosphor are converted into electrical signals by using an image pickup tube or a charge coupled device (CCD). Such an apparatus is called an image intensifier (II), which is a common technique for use in fluoroscopy. The image intensifier is one of the digital imaging techniques which can detect electrical signals as digital values.

As described above, there are various technologies for digitalizing X-ray images.

Digitalization has been increasingly required in the medical field in recent years. The digitalization of image data advantageously facilitates recording, displaying, printing, and storing of radiographed data. Image-processing the radiographed data by using a computer can support diagnosis by a doctor. Furthermore, automatic diagnosis by using only a computer without the intervention of a doctor can be realized in the near future.

Even in the medical field of the process of moving from film imaging technology, that is, an analog imaging technology, to the digital imaging technology described above, the first step of radiography is plain radiography. Plain radiography is called plain chest radiography for, for example, a chest, in which a human body is radiographed from the front (or a side) of the chest. It is said that a half size (35 cm×43 cm) or more or, if possible, a size larger than 43 cm×43 cm is generally required as an imaging area in order to cover the entire chest (the upper body) of a human body. The FPD technology is more promising than the II technology which has distorted peripheral images in the plain chest radiography.

Because body information concerning a region, such as an esophagus, trachea, lung blood vessel, alveolus, heart, cardiovascular, diaphragm, rib, or clavicle, in the neighborhood of the lung field in the upper body can be radiographed on one sheet by the plain chest radiography, the plain chest radiography is frequently adopted as a useful technology for screening focus. However, because transmitted images are observed in the plain chest radiography, it can be difficult to detect the shadow of focus that is overlapped in the transmitted images when the focus to be observed exists, for example, behind a rib or diaphragm or in the shadow of a cardiovascular portion. Accordingly, there is a problem that the efficiency of focus screening is decreased and the detection of focus can be delayed.

In order to solve such a problem, a method is realized in which radiography is performed two times by using two imaging plates (IPs) with the X-ray tube voltage being varied and subtraction is performed for X-ray images on the two IPs to remove the shadow of bones. This method, which is called energy subtraction (ES), utilizes the fact that bone tissue differs in absorptivity of X-ray energy from soft tissue, such as a blood vessel, lymphatic, or nerve, when the X-ray energy is varied.

Examples of energy subtraction will now be described. Japanese Patent Laid-Open No. 2-273873 discloses a radiographic method in which subtraction is performed after distortion is corrected in images that have been radiographed with radiation emitted from a plurality of radiation sources having different energy levels based on the image signals. Japanese Patent Laid-Open No. 3-106343 discloses a structure in which X-rays having different energy levels are generated, simultaneously with the acquisition of images, by a dual energy generating mechanism that is provided at an X-ray irradiation hole of an X-ray tube. Japanese Patent Laid-Open No. 3-133276 discloses a method for displaying energy-subtracted pictures, in which the pictures of only diseased tissue acquired as difference signals are added as three-dimensional depth information for display. Japanese Patent Laid-Open No. 5-260382 discloses a structure in which images radiographed with X-rays having different energy levels are recorded in different parts in one fluorescent sheet and subtraction is performed for the images. Japanese Patent Laid-Open No. 2000-116637 discloses a structure in which a fluoroscopic actual image of an object and a reference image are displayed in a common display at a different moment.

Although energy subtraction is useful for removing the shadows of bones, there is no guarantee that the shadows of the bones are entirely removed. Particularly, a part of the shadows of bones is disadvantageously left depending on the body type or the physical constitution of a patient or on the kind of focus. For example, focus does not always exist in the shadow of a rib and, therefore, it is not sufficient to perform only energy subtraction for removing the shadows of bones depending on the state (physical constitution or focus) of a patient when the focus exists in the shadow of a heart or diaphragm. In addition, it is difficult to detect focus when either still images or moving pictures are observed. Particularly, if the motion in a human body is relatively slow in the moving pictures, it is difficult to detect focus because of a small variation in the moving pictures. Furthermore, with the structure disclosed in Japanese Patent Laid-Open No. 2000-116637, there is a problem that it is difficult to compare the real image with a reference image because the real image and the reference image are displayed in a common display at a different moment.

SUMMARY OF THE INVENTION

In order to solve the above problems, it is an object of the present invention to provide a radiation imaging apparatus capable of highlighting abnormal regions of an object in the radiography of radiation images transmitted through the object to improve the detection ratio of the abnormal regions.

The present invention provides, in a first aspect, a radiation imaging apparatus including a radiation detecting unit and an image-display controlling unit. The radiation detecting unit has radiation detectors, arranged in a two-dimensional array, for detecting radiation transmitted through an object as electrical signals. The image-display controlling unit radiographs radiation images of the object, detected as the electrical signals by the radiation detecting unit, at a predetermined frame rate as continuous images in a plurality of frames and displays a processed image given by subtracting an m-th image from an (m+1)-th image in synchronous with either the m-th image or the (m+1)-th image that does not undergo the subtraction in a display, where m is a natural number.

The present invention provides, in a second aspect, a radiation imaging system that includes a radiation imaging apparatus including a radiation source emitting radiation, a radiation detecting unit, and an image-display controlling unit. The radiation detecting unit has radiation detectors, arranged in a two-dimensional array, for detecting radiation emitted from the radiation source and transmitted through an object as electrical signals. The image-display controlling unit radiographs radiation images of the object, detected as the electrical signals by the radiation detecting unit, at a predetermined frame rate as continuous images in a plurality of frames and displays a processed image given by subtracting an m-th image from an (m+1)-th image in synchronous with either the m-th image or the (m+1)-th image that does not undergo the subtraction in a display, where m is a natural number. The radiation source emits the pulsed radiation and sets a tube voltage when the m-th image is radiographed differently from a tube voltage when (m+1)-th image is radiographed. The processed image is given by subtracting the m-th image from the (m+1)-th image in the image-display controlling unit.

The present invention provides, in a third aspect, a radiation imaging method including a radiation detecting step for detecting radiation transmitted through an object as electrical signals by using radiation detectors arranged in a two-dimensional array; and an image-display controlling step for radiographing radiation images of the object, detected as the electrical signals in the radiation detecting step, at a predetermined frame rate as continuous images in a plurality of frames and for displaying a processed image given by subtracting an m-th image from an (m+1)-th image in synchronous with either the m-th image or the (m+1)-th image that does not undergo the subtraction in a display, where m is a natural number.

According to the present invention, performing subtraction for two images sequentially radiographed can enhance parts that vary noticeably in black or white, compared with other parts. Furthermore, synchronizing the subtracted image with the original image that does not undergo subtraction to display them in the same screen in a display allows a doctor to recognize the parts that vary noticeably and to compare the subtracted image with the original image for reading them, thus improving the detection ratio of abnormal regions such as focus.

Synchronizing the energy-subtracted image with the original image that does not undergo the subtraction to display them in parallel in the display allows the doctor to compare and read the images, thus improving the detection ratio of abnormal regions such as focus, compared with a case where a single image is read.

Furthermore, displaying the motion of a patient (e.g., the motion of diaphragm or lung field due to breathing, the motion of heart, and the like) as moving pictures sometimes elicits latent focus in a rib, clavicle, diaphragm, heart, or the like during the movement, thus further improving the detection ratio of abnormal regions such as focus.

This approach is useful not only for chest radiography but also for, for example, the detection of abnormalities of a joint including bone and tendon (muscle). Because bone differs in absorptivity of X-ray energy from a tendon (muscle) when the X-ray energy is varied, synchronizing the energy-subtracted image with the original image (the image F(m+1) or the image F(m)) to display the synchronized images in the same screen in a display as moving pictures improves the detection ratio of abnormal regions of a joint, as in a chest.

Such digitization in the medical field can improve the working efficiency in the diagnosis by a doctor or in the management of a hospital, compared with a conventional case in which analog information is processed. This contributes a creation of a medical environment having a higher quality in an aging society and an Information Technology (IT) society in future.

Further objects, features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Embodiments of a radiation imaging apparatus of the present invention will be described below with reference to the attached drawings. An X-ray is used as radiation means in the embodiments of the present invention.

First Embodiment

Figure 1:
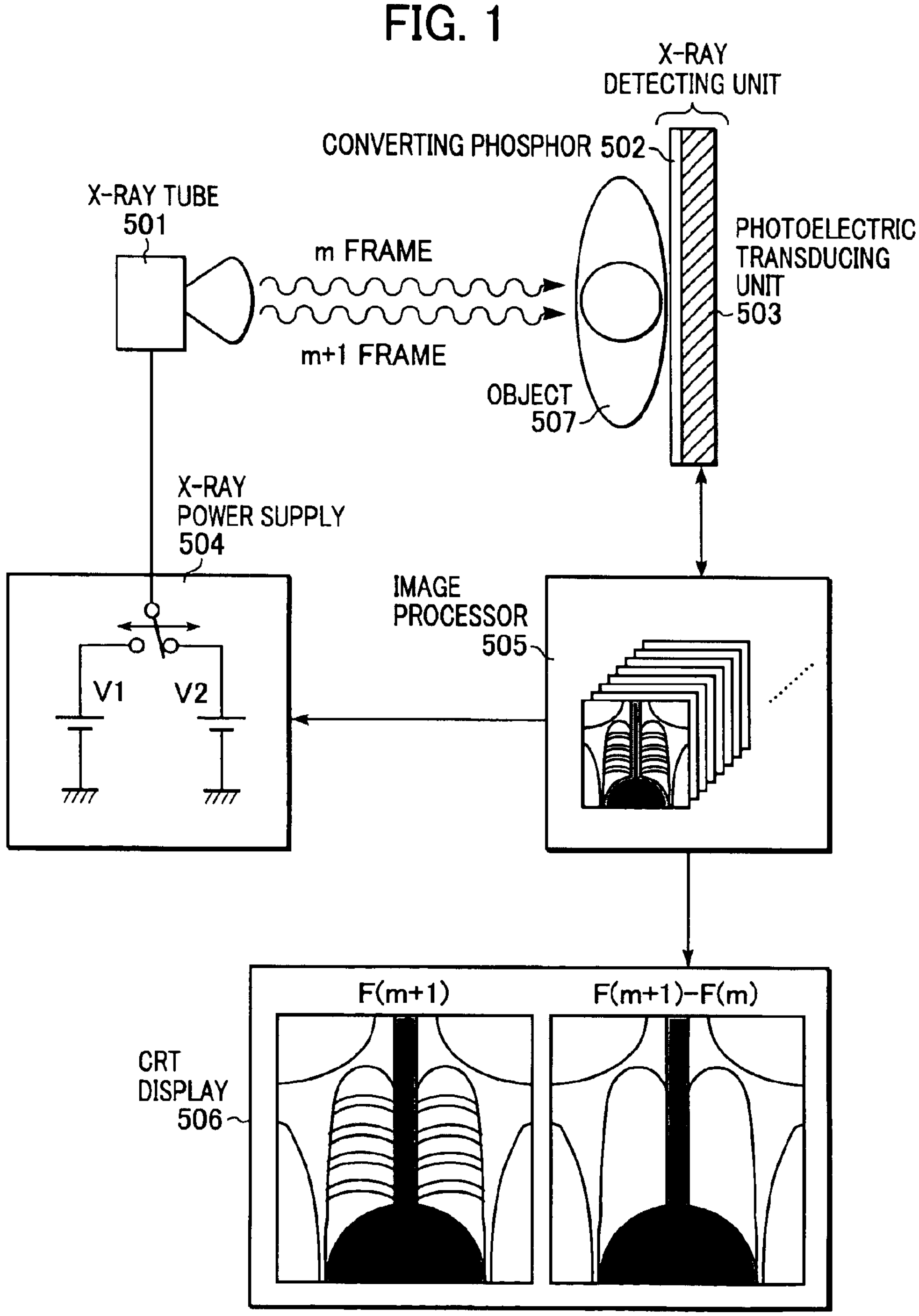
FIG. 1 is a diagram schematically showing an X-ray imaging system according to a first embodiment of the present invention.

FIG. 1 is a diagram schematically showing an X-ray imaging system according to a first embodiment of the present invention.

An object 507 is irradiated with X-rays emitted from an X-ray tube 501. The object 507 is mainly a patient. The X-rays are transmitted through the patient and are converted into visible light by an X-ray to visible-light converting phosphor 502. The visible light supplied from the phosphor 502 is converted into an electrical signal by a photoelectric transducing unit 503. As a result, the radioscopic image of the object 507 (patient) is converted into the electrical signal. The X-ray to visible-light converting phosphor 502 is substantially adhered to the photoelectric transducing unit 503 by bonding or the like. The X-ray to visible-light converting phosphor 502 is combined with the photoelectric transducing unit 503 to form an X-ray detecting unit. An X-ray power supply 504 supplies a high voltage for accelerating electrons in the X-ray tube 501. The X-ray power supply 504 is combined with the X-ray tube 501 to form an X-ray generating apparatus.

An image processor 505 is a so-called computer having the functions of recording X-ray image information converted into the electrical signal, executing an arithmetic operation for the image data, generating a control signal for operating the X-ray detecting unit, controlling the X-ray generating apparatus, and displaying the image on a cathode ray tube (CRT) display 506.

The X-ray imaging system of the first embodiment includes the X-ray generating apparatus including the X-ray power supply 504 and the X-ray tube 501, an X-ray imaging apparatus including the X-ray detecting unit, provided with the X-ray to visible-light converting phosphor 502 and the photoelectric transducing unit 503, the image processor 505, and the CRT display 506 serving as a displaying apparatus.

In the X-ray imaging system of the first embodiment, the X-ray tube 501 generates a pulsed X-ray, the X-ray detecting unit acquires multiple continuous pieces of image information of a patient, and the image processor 505 displays the image data as a moving picture on the CRT display 506. The X-ray imaging system takes continuous moving pictures while setting an image F(m) differently from an image F(m+1), where m is a natural number (hereinafter the same applies to m), and by displaying in the same display a processed image that is acquired by subtracting (energy subtraction) the image F(m) from the image F(m+1) and an original image that does not undergo the subtraction of the image F(m) or the image F(m+1) while temporally synchronizing the processed image with the original image.

The CRT display 506 in FIG. 1 displays the original image of the image F(m+1) in the left pane and the processed image acquired by subtracting the image F(m) from the image F(m+1) in the right pane. Although the image acquired by the energy subtraction of the image F(m) from the image F(m+1) is displayed in the right pane of the CRT display 506 in FIG. 1, the energy subtraction is not necessarily a simple subtraction. A detailed description will follow.

It is assumed that the image density of a rib component given by radiographing the image F(m+1) at a tube voltage V1 is D1(V1) and the blood-vessel density given thereby is D2(V1) and that the image density of a rib component given by radiographing the image F(m) at a tube voltage V2 is D1(V2) and the blood-vessel density given thereby is D2(V2). If the rib density ratio D1(V2)/D1(V1) equals 1, a rib shadow can be removed by the simple subtraction F(m+1)−F(m).

However, when the energy of the X-ray is varied, the density difference in the bone component (not limited to the bone component) occurs due to the difference in the amount of absorption of the X-ray. That is, the rib density ratio D1(V2)/D1(V1) does not equal 1. Assuming that the rib density ratio D1(V2)/D1(V1) equals k1, the rib shadow can be removed by subtraction F(m+1)−{k1×F(m)}.

In contrast, since a blood vessel has tissue (composition) different from that of a rib, the blood-vessel density ratio D2(V2)/D2(V1) equals K2 that does not equal k1. Accordingly, a vascular image is visualized, instead of being removed, even by the subtraction F(m+1)−{k1×F(m)}. Although the image F(m) multiplied by k1 is subtracted from the image F(m+1) in the above operation, for example, when k1=1.5, the image F(m) multiplied by three may be subtracted from the image F(m+1) multiplied by two. In other words, the same result is attained by subtracting an image given by an operation of F(m) from an image given by an operation of F(m+1).

A plurality of pieces of tissue, such as an esophagus, trachea, lung blood vessel, alveolus, heart, cardiovascular, diaphragm, rib, or clavicle, can be radiographed in one sheet by plain chest radiography. The subtraction may be performed not for removing one shadow but for lightening shadows of multiple pieces of tissue. Such subtraction includes the subtraction of an image given by an operation of F(m) from an image given by an operation of F(m+1). Although the subtraction for removing the rib shadow is described above, the subtraction for removing a vascular shadow may be performed. Subtraction is selected in accordance with tissue or focus to be observed.

Table 1 shows the relationship between two kinds of frames to be displayed in the same screen in the display (the CRT display 506) and their display, in the X-ray imaging system of the first embodiment.

TABLE 1

| Number of frames | Original image | Subtracted image |
|---|---|---|
| 1 | F(2) | F(2) − F(1) |
| 2 | F(3) | F(3) − F(2) |
| 3 | F(4) | F(4) − F(3) |
| 4 | F(5) | F(5) − F(4) |
| 5 | F(6) | F(6) − F(5) |
| . | . | . |
| . | . | . |
| . | . | . |

When the subtraction is represented as F(m+1)−F(m), the subtracted images are sequentially displayed in the CRT display 506 as F(2)−F(1), F(3)−F(2), F(4)−F(3), . . . F(m+1)−F(m). In contrast, the original images that do not undergo the subtraction are sequentially displayed as F(2), F(3), F(4), . . . F(m+1).

The subtracted image is always synchronized with the corresponding original image. For example, the original image F(2) is displayed when the subtracted image F(2)−F(1) is displayed. Hence, a doctor can compare and observe both the subtracted image and the original image for diagnosis.

Synchronizing the subtracted image with the original image that does not undergo the subtraction to display them in the same screen allows the doctor to compare and read the images, thus improving the detection ratio of focus. For example, performing the subtraction for two sequential images enhances parts that vary noticeably in black or white, compared with other parts. The doctor can recognize the parts that vary noticeably and can compare the subtracted image with the original image that does not undergo the subtraction to read them.

The energy-subtracted images have the advantage of removing or lightening shadows of bones such as a rib and clavicle in, for example, the chest radiography. Synchronizing the energy-subtracted image with the original image that does not undergo the subtraction to display them in parallel in the display allows the doctor to compare and read the images, thus improving the detection ratio of focus, compared with a case where a single image is read.

Displaying the motion of a patient (the motion of diaphragm or lung field due to breathing, the motion of heart, and the like) as moving pictures sometimes elicits latent focus in a rib, clavicle, diaphragm, heart, or the like during the movement, thus further improving the detection ratio of focus. This approach is useful not only for the chest radiography but also for, for example, the detection of abnormalities of a joint including bone and tendon (muscle). Since bone differs in absorptivity of X-ray energy from a tendon (muscle) when the X-ray energy is varied, synchronizing the energy-subtracted image with the original image (the image F(m+1) or the image F(m)) and displaying the synchronized images in the same screen in the CRT display 506 as moving pictures improves the detection ratio of abnormalities of a joint, as in a chest.

According to the X-ray imaging system of the present invention, since it is possible to acquire not only one still image but also a plurality of still images and to observe the images as a moving picture, the possibility is increased for detecting focus that is difficult to be detected with a still image from the motion of a body. Contrarily, there is a case in which normal tissue that is detected as focus in a still-image shadow is determined as normal by observing the motion of the body with the X-ray imaging system of the present invention, thus improving the accuracy of diagnosis.

According to the X-ray imaging system of the present invention, when the frame rate is set to fr1 (sheets/second) and frames are displayed while being subtracted, the frame rate during displaying becomes fr1/2 (sheets/second). In order to simultaneously display the original image, the display is controlled such that the frame rate is fr1/2 (sheets/second). The original image to be displayed simultaneously with the subtracted image is selected in accordance with the purpose of diagnosis.

Figure 2:
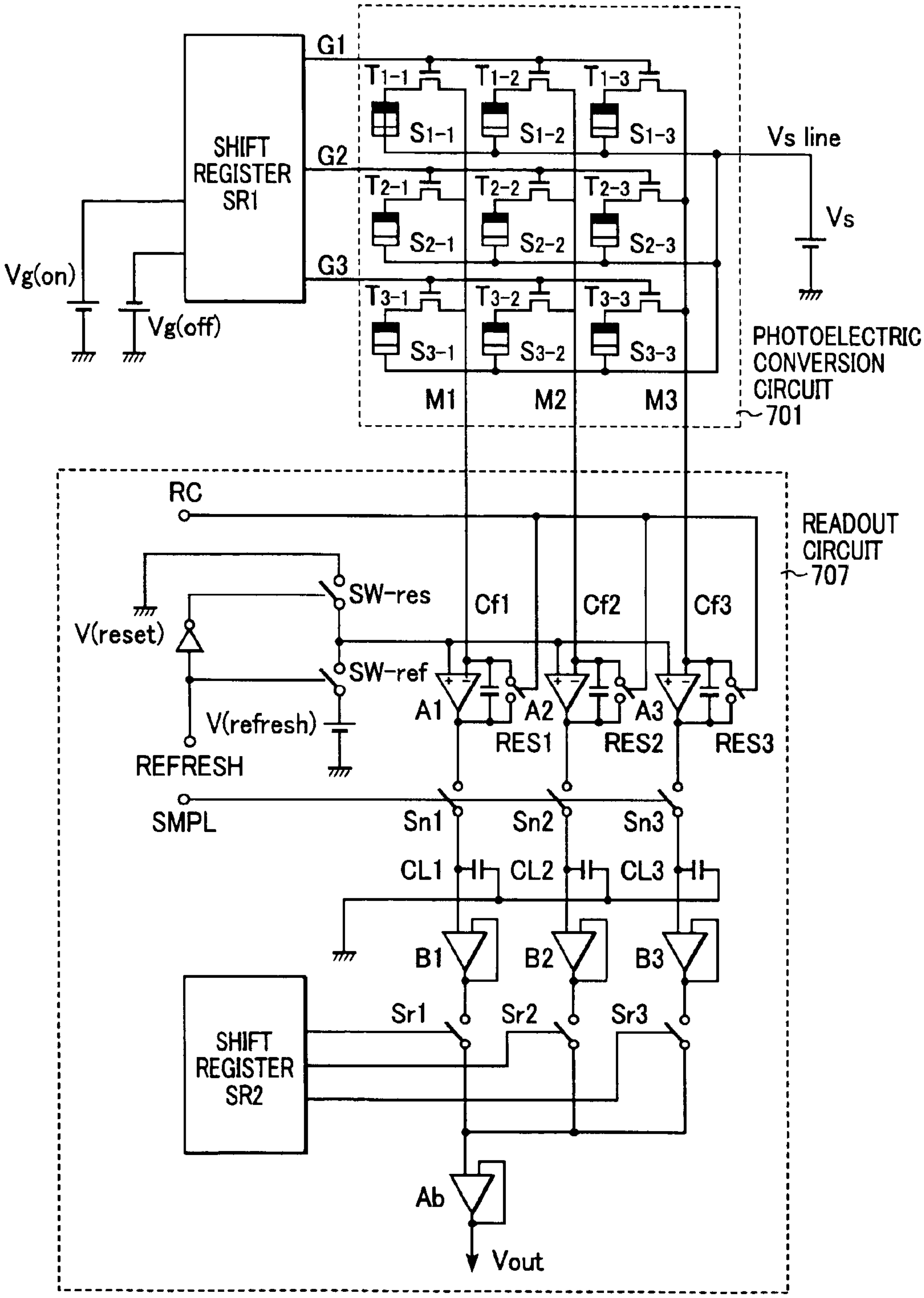
FIG. 2 is a two-dimensional circuit diagram of a photoelectric transducing unit in an X-ray imaging apparatus according to the first embodiment of the present invention.

FIG. 2 is a two-dimensional circuit diagram of the photoelectric transducing unit 503 in the X-ray imaging apparatus according to the first embodiment of the present invention. For simplicity, a photoelectric conversion circuit 701 is shown in nine (3×3) pixels in FIG. 2.

Referring to FIG. 2, the photoelectric conversion circuit 701 includes metal-insulator-semiconductor (MIS) photoelectric transducers S1-1 to S3-3, switching elements (thin film transistors) (TFTs) T1-1 to T3-3, gate drive lines G1 to G3 for turning on and off the TFTs T1-1 to T3-3, matrix signal lines M1 to M3, and a bias line Vs for giving a storage bias to the photoelectric transducers S1-1 to S3-3.

In each of the photoelectric transducers S1-1 to S3-3, an electrode filled in black is a G electrode and the opposing electrode is a D electrode. Although the D electrode is shared with part of the bias line Vs, a thin N+ layer is used as the D electrode for receiving light. The photoelectric transducers S1-1 to S3-3, the TFTs T1-1 to T3-3, the gate drive lines G1 to G3, the matrix signal lines M1 to M3, and the bias line Vs collectively means the photoelectric conversion circuit 701.

The bias line Vs is biased by a bias supply Vs. A voltage Vg (on) for externally turning on the TFTs T1-1 to T3-3 and a voltage Vg (off) for externally turning off the TFTs T1-1 to T3-3 are applied to a shift register SR1 (a driving circuit), which applies a driving pulse voltage to the gate drive lines G1 to G3.

A readout circuit 707 reads a parallel signal output from the photoelectric conversion circuit 701 and converts the signal into a serial signal for output.

The readout circuit 707 includes operational amplifiers (op-amps) A1 to A3 whose inverting terminals (−) are connected to the matrix signal lines M1 to M3, respectively. Capacitive elements Cf1 to Cf3 are connected between the inverting terminals (−) and the corresponding output terminals. The capacitive elements Cf1 to Cf3 integrate the signals supplied from the photoelectric transducers S1-1 to S3-3 with a current flowing through the capacitive elements Cf1 to Cf3 when the TFTs T1-1 to T3-3 are turned on, and convert the integrated signals into voltage. The readout circuit 707 also includes switches RES1 to RES3 for resetting the capacitive elements Cf1 to Cf3 to a reset bias voltage (reset). The switches RES1 to RES3 are connected in parallel to the capacitive elements Cf1 to Cf3. The reset bias voltage (reset) is represented by 0 V, that is, is grounded in FIG. 2.

The readout circuit 707 further includes sample-hold capacitors CL1 to CL3 for temporarily storing the signals accumulated in the op-amps A1 to A3 or the capacitive elements Cf1 to Cf3, switches Sn1 to Sn3 for sample-holding, buffer amplifiers B1 to B3, switches Sr1 to Sr3 for converting a parallel signal into a serial signal, a shift register SR2 for applying a pulse for the serial conversion to the switches Sr1 to Sr3, and a buffer amplifier Ab for outputting the serially converted signal.

A switch SW-res in the readout circuit 707 resets non-inverting terminals in the op-amps A1 to A3 to the reset bias voltage (reset) (to 0 V in FIG. 2). A switch SW-ref refreshes the non-inverting terminals in the op-amps A1 to A3 to a refreshing bias voltage (refresh). The switch SW-res and the switch SW-ref are controlled by a REFRESH signal. The switch SW-ref is turned on with the REFRESH signal being in "Hi", and the switch SW-res is turned on with the REFRESH signal being in "Lo". The switch SW-ref is structured not to be turned on simultaneously with the switch SW-res.

Figure 3:
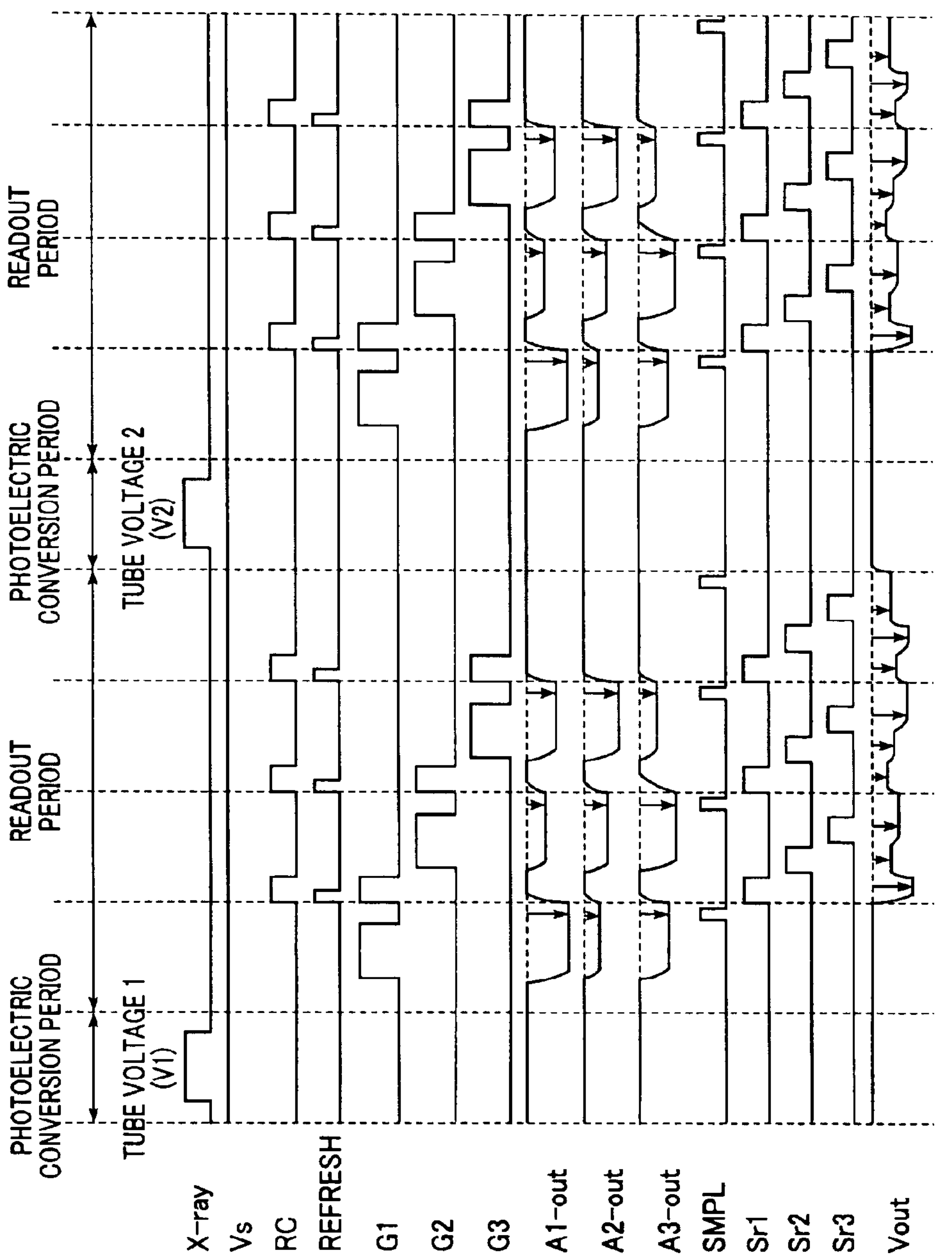
FIG. 3 is a time chart showing the operation of the photoelectric transducing unit in FIG. 2.

FIG. 3 is a timing diagram showing the operation of the photoelectric transducing unit 503 in FIG. 2 in two frames. Although the amplitude of an X-ray pulse in a first photoelectric conversion period is the same as in a second photoelectric conversion period for convenience in FIG. 3, the energy of the X-ray pulse in the first photoelectric conversion period is different from that in the second photoelectric conversion period according to the present invention. The timing diagram in FIG. 3 is continuously repeated in accordance with the number of frames in the radiography of moving pictures. The tube voltage is switched such that the energy of the X-ray corresponding to m frame is different from the energy of the X-ray corresponding to (m+1) frame.

The operation of the photoelectric transducing unit 503 in FIG. 2 will be described below with reference to the timing diagram in FIG. 3.

The photoelectric conversion period will now be described. The D electrodes of the photoelectric transducers S1-1 to S3-3 are biased by the bias supply Vs (positive voltage). All the signals supplied from the shift register SR1 are in "Lo" and all the TFTs T1-1 to T3-3 for switching are turned off. When the X-ray pulse from an X-ray source is turned on in this state, the D electrode (N+ electrode) of each of the photoelectric transducers S1-1 to S3-3 is irradiated with light to generate carriers, that is, electrons and holes, in an i layer in the photoelectric transducers S1-1 to S3-3. The electrons move into the D electrode through the bias line Vs, while the holes are stored on the surface boundary between the i layer and an insulating layer in the photoelectric transducers S1-1 to S3-3 and are held after the X-ray source is turned off.

A readout period will now be described. The readout operation is performed, first, for the first-line photoelectric transducers S1-1 to S1-3, second, for the second-line photoelectric transducers S2-1 to S2-3, and, finally, for the third-line photoelectric transducers S3-1 to S3-3. In order to read out the first-line photoelectric transducers S1-1 to S1-3, a gate pulse is applied from the shift register SR1 to the gate drive line G1 for the TFTs T1-1 to T1-3. The high level of the gate pulse is the externally supplied voltage Vg (on). This leads the TFTs T1-1 to T1-3 to be turned on, and a signal charge accumulated in the photoelectric transducers S1-1 to S1-3 flows as a current through the TFTs T1-1 to T1-3. The current flows into the capacitive elements Cf1 to Cf3 connected to the op-amps A1 to A3 and is integrated.

Readout capacitors, although not shown in FIG. 2, are connected to the matrix signal lines M1 to M3. The signal charge is transferred to the readout capacitors at the matrix-signal-line side through the TFTs T1-1 to T1-3. However, since the matrix signal lines M1 to M3 are virtually grounded by the reset bias voltage (GND) of the non-inverting terminals (+) in the op-amps A1 to A3, the voltage does not vary due to the transfer operation and the matrix signal lines M1 to M3 remains grounded. In other words, the signal charge is transferred to the capacitive elements Cf1 to Cf3.

The output terminals in the op-amps A1 to A3 vary as shown in FIG. 3 in accordance with the amount of signals supplied from the photoelectric transducers S1-1 to S1-3. Since the TFTs T1-1 to T1-3 are simultaneously turned on, the outputs from the op-amps A1 to A3 simultaneously vary, that is, they are parallel outputs. Turning on a SMPL signal in this state transfers the output signals from the op-amps A1 to A3 to the sample-hold capacitors CL1 to CL3 to turn off the SMPL signal, and the output signals are held in the sample-hold capacitors CL1 to CL3.

Then, sequentially applying a pulse to the switches Sr1, Sr2, and Sr3 in this order from the shift register SR2 outputs the signals held in the sample-hold capacitors CL1 to CL3 from the buffer amplifier Ab in the order of the sample-hold capacitor CL1, CL2, and CL3. As a result, the photoelectric conversion signals for one line of the photoelectric transducers S1-1 to S1-3 are converted into the serial signals and are sequentially output.

The readout operation for the second-line photoelectric transducers S2-1 to S2-3 and for the third-line photoelectric transducers S3-1 to S3-3 are performed in the same manner as in the first-line photoelectric transducers S1-1 to S1-3 described above.

Sample-holding the signals from the op-amps A1 to A3 in the sample-hold capacitors CL1 to CL3 by using the SMPL signal for the first line outputs the signals supplied from the photoelectric transducers S1-1 to S1-3 from the photoelectric conversion circuit 701. Accordingly, it is possible to perform the refreshing operation of the photoelectric transducers S1-1 to S1-3 and the reset operation of the capacitive elements Cf1 to Cf3 in the photoelectric conversion circuit 701, while the signals are serially converted and output by using the switches Sr1 to Sr3 in the readout circuit 707.

The refreshing operation of the photoelectric transducers S1-1 to S1-3 is achieved by turning on the switch SW-ref with the REFRESH signal being in "Hi", by turning on the switches RES1 to RES3 by using an RC signal, and by applying the voltage Vg (on) to the gate drive line G1 of the TFTs T1-1 to T1-3. In other words, the refreshing operation refreshes the G electrodes of the photoelectric transducers S1-1 to S1-3 to the refreshing bias voltage (refresh). The refreshing operation then proceeds to the reset operation.

The reset operation switches the REFRESH signal to "Lo" while applying the voltage Vg (on) to the gate drive line G1 of the TFTs T1-1 to T1-3 and turning on the switches RES1 to RES3. This reset operation resets the G electrodes of the photoelectric transducers S1-1 to S1-3 to the reset bias voltage (reset)=GND and also resets the signals accumulated in the capacitive elements Cf1 to Cf3.

After the reset operation is completed, a gate pulse can be applied to the gate drive line G2. Specifically, it is possible to refresh the photoelectric transducers S1-1 to S1-3, to reset the capacitive elements Cf1 to Cf3, and to transfer the signal charges in the second-line photoelectric transducers S2-1 to S2-3 to the matrix signal lines M1 to M3 by the shift register SR1, while serially converting the signals in the first-line photoelectric transducers S1-1 to S1-3 by the shift register SR2.

In the manner described above, the signal charges in all the photoelectric transducers S1-1 to S3-3 from the first line to the third line can be output. Furthermore, repeating the operation for one frame several times can provide the moving picture.

Figure 4:
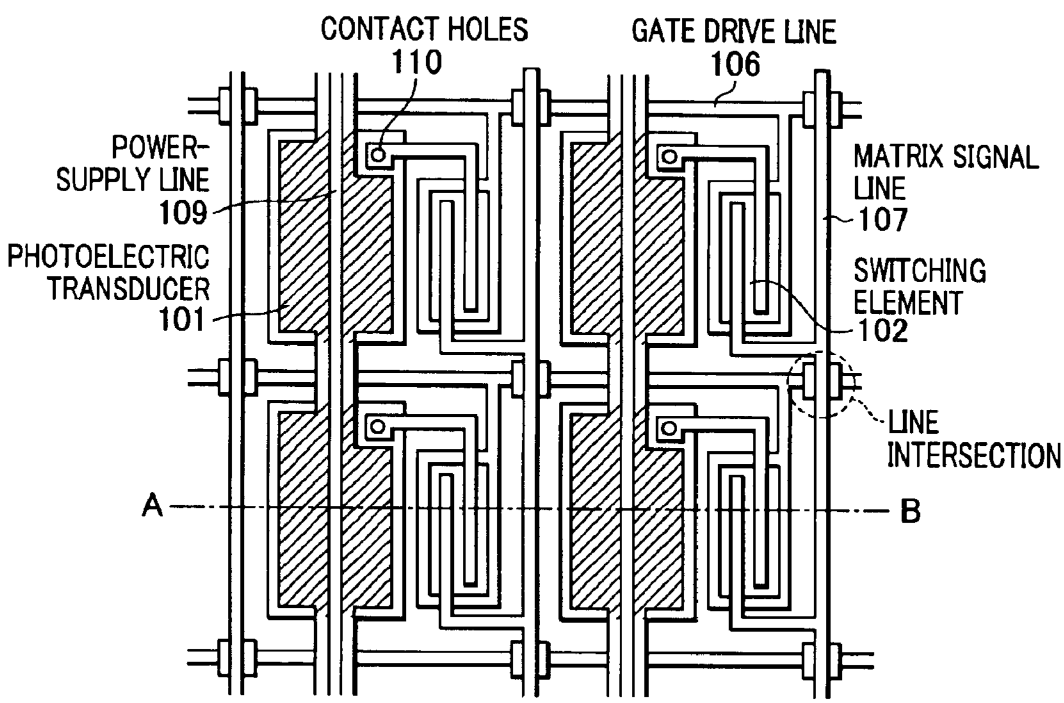
FIG. 4 is the wiring diagram showing a pattern of a photoelectric conversion circuit.
Figure 5:
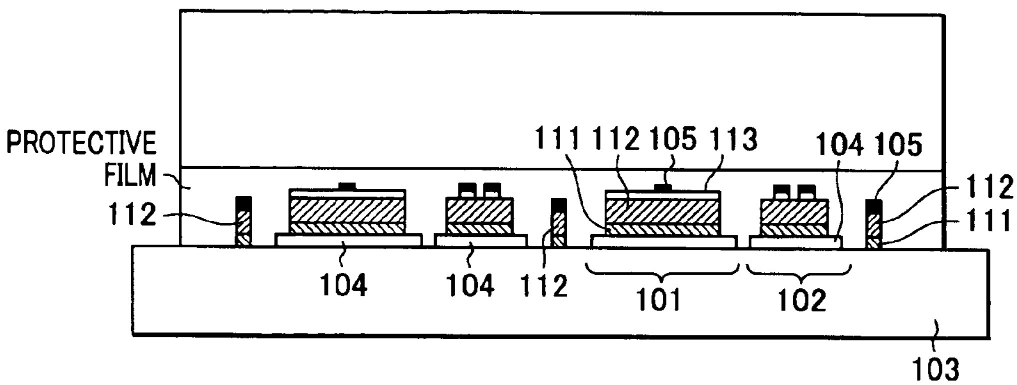
FIG. 5 is a cross-sectional view of the photoelectric conversion circuit in FIG. 4 taken along line A–B.

FIG. 4 is the wiring diagram showing a pattern of the photoelectric conversion circuit 701. Metal-insulator-semiconductor (MIS) photoelectric transducers 101 and switching elements 102 that are formed of amorphous silicon semiconductor film, and the wiring for connecting the photoelectric transducers 101 to the switching elements 102 are shown in FIG. 4. FIG. 5 is a cross-sectional view of the photoelectric conversion circuit 701 depicted in FIG. 4 taken along line A–B. The MIS photoelectric transducers will be simply referred to as the photoelectric transducers for simplicity.

The photoelectric transducers 101 and the switching elements 102 (the amorphous silicon TFTs) (hereinafter referred to as TFTs) are formed on the same insulating substrate 103. The lower electrode of each of the photoelectric transducers 101 is a first thin metal film 104 shared with the lower electrode (gate electrode) of each of the TFTs 102. The upper electrode of each of the photoelectric transducers 101 is a second thin metal film 105 shared with the upper electrode (source electrode and the drain electrode) of each of the TFTs 102. The first thin metal film 104 also shares gate drive lines 106 and matrix signal lines 107 in the photoelectric conversion circuit 701 with the second thin metal film 105.

Referring to FIG. 4, four pixels (2×2) are shown. Hatched parts in FIG. 4 are light-receiving planes of the photoelectric transducers 101. The photoelectric conversion circuit 701 further includes power-supply lines 109 for applying a bias voltage to the corresponding photoelectric transducers 101 and contact holes 110 for connecting the photoelectric transducers 101 to the corresponding TFTs 102. With the structure of the photoelectric conversion circuit 701 that is mainly made of an amorphous silicon semiconductor, shown in FIG. 4, it is possible to simultaneously form the photoelectric transducers 101, the TFTs 102, the gate drive lines 106, and the matrix signal lines 107 on the same substrate (the insulating substrate 103), thus easily realizing the photoelectric conversion circuit 701 having a large area at a low price.

The operation of the single photoelectric transducer 101 will now be described.

Figure 6:
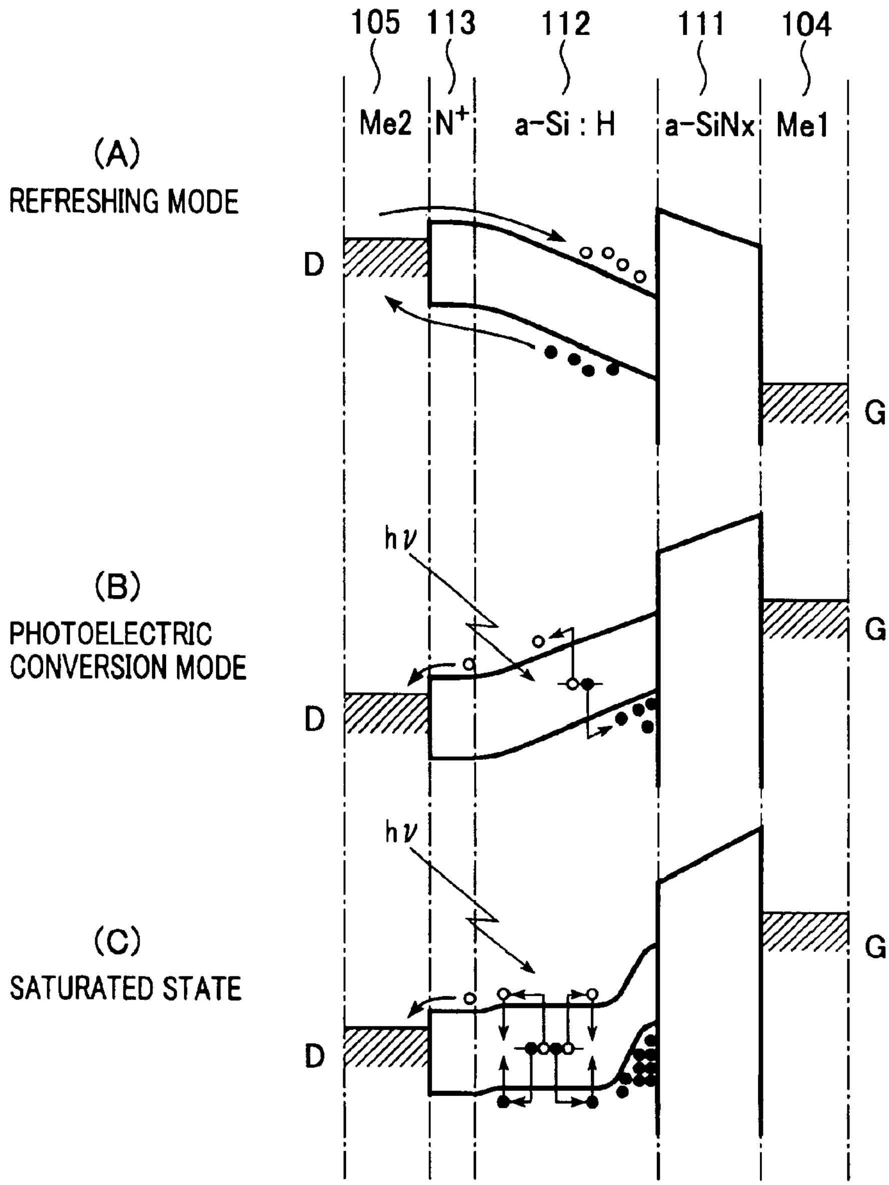
FIG. 6 is an energy band diagram for illustrating the operation of a photoelectric transducer shown in FIGS. 4 and 5.

FIG. 6 is an energy band diagram for illustrating the operation of the photoelectric transducer 101 shown in FIGS. 4 and 5. FIG. 6(A) shows the operation in a refreshing mode, FIG. 6(B) shows the operation in a photoelectric conversion mode, and FIG. 6(C) shows the operation in a saturated state.

The horizontal axis in FIGS. 6(A) to 6(C) represents states of each layer shown in FIG. 5 in the direction of the film thickness. A lower electrode (G electrode) Me1 is formed of the first thin metal film 104 (for example, chromium). An amorphous silicon nitride (a-SiNx) thin insulating film 111 is an insulating layer for blocking the passage of both the electrons and the holes. The a-SiNx thin insulating film 111 must have a thickness that does not provide a tunnel effect and ordinarily has a thickness of 50 nm or more. An amorphous silicon hydride (a-Si:H) semiconductor thin film 112 is a photoelectric-conversion semiconductor layer formed of an intrinsic semiconductor layer (i layer) that is not intentionally doped with dopant. An N+ layer 113 blocks the injection of a single conductive carrier made of a non-monocrystalline semiconductor, such as an N-type a-Si:H layer. The N+ layer 113 is formed for blocking the injection of the holes into the a-Si:H semiconductor thin film 112. An upper electrode (D electrode) Me2 is formed of the second thin metal film 105 (for example, aluminum).

Although the second thin metal film 105 (D electrode) does not entirely cover the N+ layer 113 in FIG. 5, the second thin metal film 105 (D electrode) has the same potential as the N+ layer 113 because the electrons freely move between the second thin metal film 105 (D electrode) and the N+ layer 113. The following description is premised on this.

The photoelectric transducer 101 has two operation modes, that is, a refreshing mode and a photoelectric conversion mode, depending on how a voltage is applied to the D electrode or the G electrode.

The D electrode has an electronegative potential with respect to the G electrode in the refreshing mode in FIG. 6(A). The holes shown by black circles in the a-Si:H semiconductor thin film 112 (i layer) are led to the D electrode by the electric field. Simultaneously, the electrons shown by white circles are injected into the a-Si:H semiconductor thin film 112 (i layer). At this time, part of the holes and the electrons is recombined in the N+ layer 113 and the a-Si:H semiconductor thin film 112 (i layer) and disappears. If this state lasts for a sufficiently long time, the holes are swept out of the a-Si:H semiconductor thin film 112 (i layer).

In order to move the photoelectric transducer 101 from this state to the photoelectric conversion mode in FIG. 6(B), an electropositive potential is applied to the D electrode with respect to the G electrode. This instantly leads the electrons in the a-Si:H semiconductor thin film 112 (i layer) to the D electrode. However, since the N+ layer 113 serves to block the injection of the holes, the holes are not led to the a-Si:H semiconductor thin film 112 (i layer). When light is incident on the a-Si:H semiconductor thin film 112 (i layer), the incident light is absorbed and electron-hole pairs are generated. The electrons are led to the D electrode by the electric field, while the holes move in the a-Si:H semiconductor thin film 112 (i layer) to reach the surface boundary between the a-Si:H semiconductor thin film 112 (i layer) and the a-SiNx thin insulating film 111.

However, since the holes cannot move into the a-SiNx thin insulating film 111, the holes remain in the a-Si:H semiconductor thin film 112 (i layer). At this time, the electrons that move into the D electrode and the holes that move toward the surface boundary between the a-SiNx thin insulating film 111 and the a-Si:H semiconductor thin film 112 (i layer) cause a current to flow from the G electrode for maintaining the electroneutrality in the photoelectric transducer 101. Since the current corresponds to the electron-hole pairs caused by the light, the current is proportional to the incident light.

When the photoelectric transducer 101 enters the refreshing mode in FIG. 6(A) again after the photoelectric conversion mode in FIG. 6(B) is kept for a predetermined period, the holes that have stayed in the a-Si:H semiconductor thin film 112 (i layer) are led to the D electrode, as described above, and a current corresponding to the amount of the holes simultaneously flows. The amount of holes corresponds to the total amount of light incident during the photoelectric conversion mode. Although a current corresponding to the amount of electrons injected into the a-Si:H semiconductor thin film 112 (i layer) also flows, the amount of this current is almost constant and, therefore, the amount of the current can be subtracted for detection. In other words, the photoelectric transducer 101 can output the amount of incident light in real time and, simultaneously, can detect the total amount of light incident during a predetermined period.

However, no current can flow in despite receiving the light, when the photoelectric conversion mode lasts for a long time or when the incident light has a higher illuminance for some reason. This is because the multiple holes staying in the a-Si:H semiconductor thin film 112 (i layer) reduce in size the electrical field In the a-Si:H semiconductor thin film 112 (i layer) and, therefore, the generated electrons are not led to the D electrode and are recombined with the holes in the a-Si:H semiconductor thin film 112 (i layer), as shown in FIG. 6(C). This is called the saturated state of the photoelectric transducer 101. When the state of the incident light varies in the saturated state, a current can unstably flow. However, if the photoelectric transducer 101 returns to the refreshing mode shown in FIG. 6(A), the holes are swept out of the a-Si:H semiconductor thin film 112 (i layer) and a current in proportion to the incident light flows in the subsequent photoelectric conversion mode in FIG. 6(B).

Although all the holes are ideally swept out of the a-Si:H semiconductor thin film 112 (i layer) in the refreshing mode in the above description, sweeping only part of the holes has an effect and a current equal to the above current flows in such a case. In other words, there is no problem if the photoelectric transducer 101 is in the saturated state in FIG. 6(C) in the following detection in the photoelectric conversion mode. The potential of the D electrode with respect to the G electrode in the refreshing mode. the time period of the refreshing mode, and the characteristics of the N+ layer 113 serving to block the injection of the holes should be determined here.

Furthermore, the injection of the electrons into the a-Si:H semiconductor thin film 112 (i layer) is not a prerequisite in the refreshing mode, and the potential of the D electrode with respect to the G electrode is not limited to be negative. This is because, when the multiple holes stay in the a-Si:H semiconductor thin film 112 (i layer), the electrical field in the a-Si:H semiconductor thin film 112 (i layer) is exerted so as to lead the holes to the D electrode even if the potential of the D electrode with respect to the G electrode is negative. Similarly, the injection of the electrons into the a-Si:H semiconductor thin film 112 (i layer) is not a prerequisite of the N+layer 113 serving to block the injection of the holes.

Second Embodiment

In an X-ray imaging system according to a second embodiment of the present invention, an image given by subtracting an image F(m) from an image F(m+1) is synchronized with an original image of the image F(m) (the original image of the image F(m+1) in the first embodiment) that does not undergo the subtraction to display the image F(m) and the image F(m+1) in parallel in the same screen in a display.

This subtraction provides difference images between frames. Images of parts that move noticeably or parts whose density significantly varies can be enhanced in black or white, compared with images of other parts. Synchronizing the subtracted image with the original image to display them allows a doctor to compare the subtracted image with the original image and to read them.

Table 2 shows the relationship between two kinds of frames to be displayed in the same screen in the display and their display, in the X-ray imaging system of the second embodiment.

TABLE 2

| Number of frames | Original image | Subtracted image |
|---|---|---|
| 1 | F(1) | F(2) − F(1) |
| 2 | F(2) | F(3) − F(2) |
| 3 | F(3) | F(4) − F(3) |
| 4 | F(4) | F(5) − F(4) |
| 5 | F(5) | F(6) − F(5) |
| . | . | . |
| . | . | . |
| . | . | . |

When the subtraction is represented as F(m+1)−F(m), the subtracted images are sequentially displayed in the display as F(2)−F(1), F(3)−F(2), F(4)−F(3), . . . F(m+1)−F(m). In contrast, the original images that do not undergo the subtraction are sequentially displayed as F(1), F(2), F(3), . . . F(m).

The subtracted image is always synchronized with the corresponding original image. For example, the original image F(1) is displayed when the subtracted image F(2)−F(1) is displayed. Hence, the doctor can compare and observe both the subtracted image and the original image for diagnosis.

In the X-ray imaging apparatus according to any of the embodiments of present invention, the subtraction may be performed after grayscale conversion or edge enhancement has been performed in advance for the image F(m+1) or the image F(m) as required.

The X-ray to visible-light converting phosphor 502 is made of material including gadolinium oxysulfide ($Gd_2O_2S$), gadolinium oxide ($Gd_2O_3$), cesium iodide (CsI), or the like as a principal component. Although the MIS photoelectric transducers are taken as an example, they may be pin sensors. In addition, the photoelectric transducer may be made of lead Iodide, mercury iodide, selenium, cadmium telluride, gallium arsenide, gallium phosphide, zinc sulfide, silicon, or the like, without using the X-ray to visible-light converting phosphor 502 in the X-ray detecting unit, and the radiation transmitted through the object 507 may be directly converted into electrical signals.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A radiation imaging apparatus comprising:

a radiation detecting unit having radiation detectors, arranged in a two-dimensional array, for detecting radiation transmitted through an object as electrical signals; and an image-display controlling unit for radiographing radiation images of the object, detected as the electrical signals by said radiation detecting unit, at a predetermined frame rate as continuous images in a plurality of frames and for displaying a processed image given by subtracting an m-th image from an (m+1)-th image in synchronous with either the m-th image or the (m+1)-th image that does not undergo the subtraction in a display, where m is a natural number.

2. A radiation imaging apparatus according to claim 1, wherein said image-display controlling unit performs the subtraction after grayscale conversion or edge enhancement is performed for the m-th image or the (m+1)-th image as required.

3. A radiation imaging apparatus according to claim 1 or 2, wherein the radiation detectors each include a wavelength converter for converting the radiation into visible light and a photoelectric transducer for transducing the visible light converted by the wavelength converter into the electrical signals.

4. A radiation imaging apparatus according to claim 3, wherein the wavelength converter is made of material including gadolinium oxysulfide, gadolinium oxide, or cesium iodide as a principal component.

5. A radiation imaging apparatus according to claim 4, wherein the photoelectric transducer is a metal-insulator-semiconductor (MIS) sensor or a pin sensor using an amorphous silicon semiconductor.

6. A radiation imaging apparatus according to claim 5, wherein the MIS sensor includes:

a first thin metal film formed as a lower electrode;

an insulating film made of amorphous silicon nitride, formed on the first thin metal film, for blocking passage of electrons and holes;

a photoelectric-conversion layer made of amorphous silicon hydride, formed on the insulating film;

an N-type injection-blocking layer, formed on the photoelectric-conversion layer, for blocking the injection of the holes; and a transparent conductive layer formed on the N-type injection-blocking layer as an upper electrode or a second thin metal film formed on part of the injection-blocking layer, wherein, in a refreshing mode, an electrical field is exerted on the MIS sensor so as to lead the holes from the photoelectric-conversion layer to the second thin metal film, wherein, in a photoelectric conversion mode, the electrical field is exerted on the MIS sensor such that the holes generated by the radiation incident on the photoelectric-conversion layer stay in the photoelectric-conversion layer and so as to lead the electrons to the second thin metal film, and wherein the holes accumulated in the photoelectric-conversion layer in the photoelectric conversion mode or the electrons led to the second thin metal film are detected as optical signals.

7. A radiation imaging apparatus according to claim 3, wherein the photoelectric transducer is a metal-insulator-semiconductor (MIS) sensor or a pin sensor using an amorphous silicon semiconductor.

8. A radiation imaging apparatus according to claim 7, wherein the MIS sensor includes:

a first thin metal film formed as a lower electrode;

an insulating film made of amorphous silicon nitride, formed on the first thin metal film, for blocking passage of electrons and holes;

a photoelectric-conversion layer made of amorphous silicon hydride, formed on the insulating film;

an N-type injection-blocking layer, formed on the photoelectric-conversion layer, for blocking the injection of the holes; and a transparent conductive layer formed on the N-type injection-blocking layer as an upper electrode or a second thin metal film formed on part of the injection-blocking layer, wherein, in a refreshing mode, an electrical field is exerted on the MIS sensor so as to lead the holes from the photoelectric-conversion layer to the second thin metal film, wherein, in a photoelectric conversion mode, the electrical field is exerted on the MIS sensor such that the holes generated by the radiation incident on the photoelectric-conversion layer stay in the photoelectric-conversion layer and so as to lead the electrons to the second thin metal film, and wherein the holes accumulated in the photoelectric-conversion layer in the photoelectric conversion mode or the electrons led to the second thin metal film are detected as optical signals.

9. A radiation imaging apparatus according to claim 1 or 2, wherein each of the radiation detectors, made of lead iodide, mercury iodide, selenium, cadmium telluride, gallium arsenide, gallium phosphide, zinc sulfide, or silicon, absorbs the radiation and directly converts the absorbed radiation into the electrical signals.

10. A radiation imaging system having a radiation imaging apparatus comprising:

a radiation source emitting radiation;

a radiation detecting unit having radiation detectors, arranged in a two-dimensional array, for detecting radiation emitted from the radiation source and transmitted through an object as electrical signals: and an image-display controlling unit for radiographing radiation images of the object, detected as the electrical signals by the radiation detecting unit, at a predetermined frame rate as continuous images in a plurality of frames and for displaying a processed image given by subtracting an m-th image from an (m+1)-th image in synchronous with either the m-th image or the (m+1)-th image that does not undergo the subtraction in a display, where m is a natural number, wherein the radiation source emits the pulsed radiation and sets a tube voltage when the m-th image is radiographed differently from a tube voltage when (m+1)-th image is radiographed, and wherein the processed image is given by subtracting the m-th image from the (m+1)-th image in the image-display controlling unit.

11. A radiation imaging method comprising:

a radiation detecting step, of detecting radiation transmitted through an object as electrical signals by using radiation detectors arranged in a two-dimensional array; and an image-display controlling step, of radiographing radiation images of the object, detected as the electrical signals in said radiation detecting step, at a predetermined frame rate as continuous images in a plurality of frames and for displaying a processed image given by subtracting an m-th image from an (m+1)-th image in synchronous with either the m-th image or the (m+1)-th image that does not undergo the subtraction in a display, where m is a natural number.

* * * * *

UNITED STATES PATENT AND TRADEMARK OFFICE

CERTIFICATE OF CORRECTION

PATENT NO. : 6,952,464 B2
DATED : October 4, 2005
INVENTOR(S) : Tadao Endo

It is certified that error appears in the above-identified patent and that said Letters Patent is hereby corrected as shown below:

Column 12,
Line 31, "In" should read -- in --.

Column 13,
Line 55, "Iodide," should read -- iodide, --.

Column 14,
Line 34, "claim 4," should read -- claim 3, --.

Column 15,
Line 1, "claim 3," should read -- claim 4, --.

Column 16,
Line 8, "signals:" should read -- signals; --.

Signed and Sealed this

Sixth Day of June, 2006

JON W. DUDAS
*Director of the United States Patent and Trademark Office*